May 8, 1956
E. L. THOMAS
2,745,007
NETWORKS FOR COMPENSATING ERRORS DUE TO
ABSORPTION EFFECTS IN CAPACITORS
Filed Jan. 5, 1951
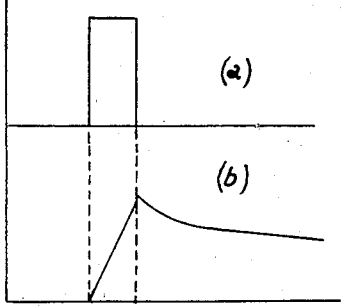
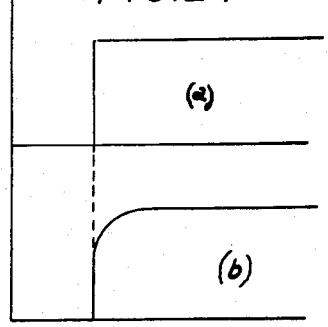
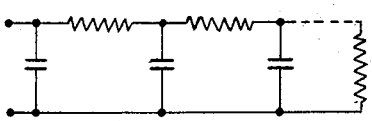
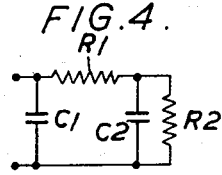
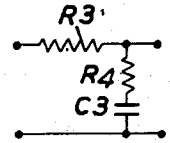
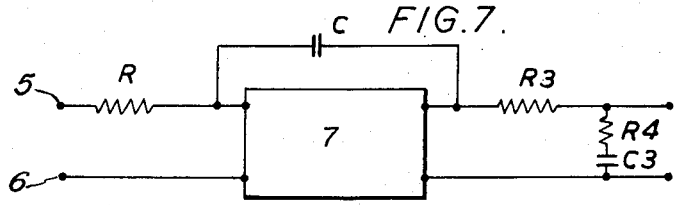
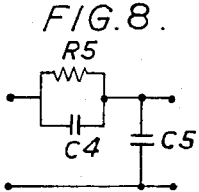
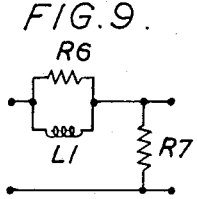
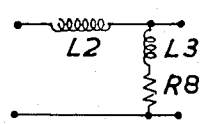
Inventor
ERIC LLOYD THOMAS
By
*his Attorney*

United States Patent Office 2,745,007
Patented May 8, 1956

2,745,007

NETWORKS FOR COMPENSATING ERRORS DUE TO ABSORPTION EFFECTS IN CAPACITORS

Eric Lloyd Thomas, Wembley, England, assignor, by mesne assignments, to The Sperry Gyroscope Company, Limited, Brentford, England, a company of Great Britain Application January 5, 1951, Serial No. 204,671

Claims priority, application Great Britain January 5, 1950

6 Claims. (Cl. 250—27)

This invention relates to the effect of absorption in capacitors and its object is to provide a network for compensating errors due to such effects.

It has been found that if a solid-dielectric capacitor, which was previously discharged, is suddenly charged and then isolated, the potential difference across it varies with time. A comparatively rapid initial drop in voltage takes place which may last for several seconds, after which the decay becomes less marked and eventually it settles down to a rate, the time-constant of which may be called the long-term constant of the capacitor. This phenomenon may be explained by assuming that the resistance of the insulation of the capacitor builds up slowly to a maximum value, or by theories of internal action in solid dielectrics that make a solid-dielectric capacitor analogous to a network of ideal capacitors and resistors, e. g., a ladder network with resistors as series elements and capacitors as shunt elements. Such theories predict that the behaviour of solid-dielectric capacitors both in charge and discharge will be non-uniform in course of time, and that the phenomena that occur at any instant depend not only on the potential difference applied at that instant, but also on the past history of the capacitor. All such effects are designated as absorption effects.

In certain applications, such as precision electronic integrators, the accurate performance of the apparatus is often seriously limited by absorption effects. Usually it is desirable that the time constant of the capacitor should be as large as possible; but an even more important factor is that the effective capacitance should not vary with time during the charging process.

If it is assumed that the capacitor is actually equivalent to a ladder network, or if its behaviour in charging or discharging is capable of being simulated by such a network, as is frequently supposed to be the case, then it should be possible to compensate for the effects of the absorption by combining the capacitor with a suitable correcting circuit.

The invention consists in a network for compensating errors due to absorption effects in a capacitor comprising resistive and reactive elements, the time-constant of which, or one of the time-constants of which, is of the order of magnitude of a time-constant associated with absorption effects in the dielectric of the capacitor, and the values of which are so chosen that, in a circuit in which the capacitor and the network are used in combination, the output of the circuit in response to an input is substantially that which would be obtained if the capacitor were replaced by an ideal capacitor shunted by a high-resistance resistor and the network were absent.

The invention also consists in a capacitor in combination with a network according to the preceding paragraphs for compensating errors due to absorption effects in its dielectric.

The invention also consists in an electronic integrator having a feed-back capacitor, the dielectric absorption effects of which, are compensated by a network according to the last paragraph but one.

It has been found that the simplest method of compensating a capacitor according to the invention is to take measurements of its discharge through an extremely high resistance, e. g., through its own internal leakage and to design the compensating circuit to modify the initial portion of the discharge curve to convert it into a straight-line continuation of the subsequent practically linear portion of the discharge curve. It is found in most cases that a compensative circuit designed in this manner compensates satisfactorily not only for the initial faster rate of discharge but also for all other absorption effects.

It is generally necessary to separate the capacitor from its compensating network so as to prevent interaction between the two. This can be effected conveniently by interposing a buffer unit, such as a valve amplifier, between the capacitor and the compensating network.

A suitable compensating network having input and output terminals consists of three elements, a resistive series arm, followed by a shunt arm comprising capacitance and resistance in series.

In the accompanying drawings:

Fig. 1 shows graphically the charging voltage and the discharge voltage across a capacitor of a particular type.

Fig. 2 shows graphically the characteristics of a compensating network according to the invention.

Fig. 3 shows the equivalent circuit of a solid-dielectric capacitor.

Fig. 4 shows a simplified form of Fig. 3.

Fig. 5 is a schematic diagram of one form of compensating network according to the invention.

Fig. 6 is a block schematic diagram of a circuit incorporating the compensating network according to the invention.

Fig. 7 shows the compensating network applied to an electronic integrator.

Figs. 8, 9 and 10 show alternative forms of compensating network according to the invention.

In the investigation of the effect of dielectric absorption in capacitors a solid-dielectric capacitor previously discharged was charged by a voltage having the waveform shown in Fig. 1 (a) by being connected to a battery through a switch. The switch was closed for approximately 5 seconds. At the end of the 5 seconds the switch was opened so that the capacitor was isolated from the charging circuit. It was then allowed to discharge through the high resistance constituted by its own internal leakage. During the discharge period the voltage across the capacitor was measured by means of a cathode-ray oscilloscope and was found to be of the form shown in Fig. 1 (b). It is seen that at the end of the charging period there is an initial comparatively rapid drop in voltage lasting for approximately 10 seconds, followed by a more gradual decay which eventually settles down to a rate determined by what may be called the long term time-constant of the capacitor. This effect can be explained by supposing that the insulation resistance of the capacitor dielectric builds up slowly to a maximum value or by regarding the actual capacitor as being composed of a network of ideal capacitors and resistors arranged as in Fig. 3. In fact it has been found that for practical purposes the capacitor may be regarded as being composed of a network of ideal capacitors and resistors arranged as shown in Fig. 4.

If it is assumed that a capacitor may be regarded as a network of this type it is possible to design a network which operates to cancel out the effects caused by dielectric absorption. Consideration of Fig. 1 indicates that such a network should have characteristics as shown in Fig. 2. This latter figure shows at (b) the response such a network should have to a step voltage of the kind shown at (a).

One convenient form of compensating network is shown in Fig. 5. This comprises a series arm consisting of resistor R3 and a shunt arm consisting of resistor R4 and capacitor C3 in series. In order that this network, when used in combination with a capacitor having an equivalent circuit of the kind shown in Fig. 4, may effectively have the characteristics of an ideal capacitor shunted by a large resistor, the following relations must be satisfied:

$$R1.C2 = R4.C3$$

and $$R3/R4 = C2/C1$$

A network which satisfies this relationship will give correct compensation provided that the charging device connected across the input terminals of the network has a low output impedance and the load connected across the output terminals has a high impedance. If these conditions are assumed it can be seen that for correct compensation the ratio R3/R4 must equal the fractional drop in output when the charging circuit is disconnected, and that this drop is determined by the ratio C2/C1. Further, the time-constant R4.C3 must be equal to that of the initial decay of the voltage across the capacitor which can be seen to be R1.C2. If compensation is perfect the combined effect of the two networks shown in Figs. 4 and 5 is a capacitor of value C1 shunted by a resistor of value R2, where R2 is the internal leakage resistance of the capacitor. The time-constant of this combination is referred to herein as the long term time-constant of the capacitor.

In practice it is generally found necessary to separate the capacitor from its compensating network in order to prevent any interaction between the two. This can be done by interposing a buffer unit such as a valve amplifier between them. Such an arrangement is shown in Fig. 6 in which (1) is a charging device, (2) is the capacitor, (3) is a buffer amplifier and (4) is the compensating network. In a particular embodiment of the arrangement shown in Fig. 6 the capacitor has a value of 0.5 $\mu$ f. and a long term time-constant of the order of $10^6$ seconds. With a component of this type the initial fractional drop in voltage after the disconnection of the charging circuit was found to be about 15 mv. in 50 v. or approximately 1/3000. This is equivalent to the ratio C2/C1. Also the time taken for the initial comparatively rapid voltage drop is of the order of 15 seconds. This is equivalent to the product R1.C2. Using a compensating network of the kind shown in Fig. 5, circuit values which have been found successful with such a capacitor are as follows:

R3 = 3,000 ohms.
R4 = 7,000,000 ohms.
C3 = 2 $\mu$ f.

In such an arrangement the time-constant of the system is within the limits of approximation independent of the rate at which the capacitor is charged and equal to the long period time-constant of that component.

The requirement for a capacitor having its characteristics corrected in accordance with the teachings of the present invention arises particularly in the design of accurate electronic integrators. A schematic diagram of an integrator using a compensating network according to the invention is shown in Fig. 7. In this drawing the signal to be integrated is applied to terminals 5 and 6 and through the integrating resistor R to the input terminals of a high-stability D. C. amplifier 7. This amplifier in the arrangement shown has unbalanced input and output (i. e. has one input terminal and one output terminal earthed) and comprises an odd number of amplifying stages so that its output is of opposite sense to its input. It may conveniently be of the kind described in co-pending application S. N. 130,328, filed in the names of Hugh Brougham Sedgfield and Frederick Arthur Summerlin on November 30, 1949, which issued as U. S. Patent 2,730,573 on January 10, 1956. The amplifier is converted into an integrator by connecting its live output terminal to its live input terminal via the capacitor C. The capacitor C is the one for the dielectric absorption effects of which the compensating network is provided. This compensating network is similar to that shown in Fig. 5 and comprises resistors R3 and R4 and capacitor C3. In an electronic integrator of this type the output voltage $v_0$ is related to the input voltage $v_i$ according to the following equation:

$$v_0 = \frac{1}{RC} \cdot v_i \cdot e^{-\frac{1}{mRC}t}$$

where $m$ is the gain of the amplifier. Thus the rate of integration is determined by the expression $$\frac{1}{RC}$$

If no compensating network is used it is found that the rate of integration varies with different levels of input voltage $v_i$ due to absorption effects in the capacitor C. However, when a compensating network designed in accordance with the principles of the invention is interposed between the output and the load, the rate of integration is substantially independent of the level of the input voltage.

The compensating network shown in Fig. 5 has been found to be the most convenient to use in practice but any of those shown in Figs. 8, 9 or 10 are in theory equally suitable. That shown in Fig. 8 comprises a series arm consisting of a resistor R5 and capacitor C4 in parallel and a shunt arm consisting of a capacitor C5. That shown in Fig. 9 comprises a series arm consisting of a resistor R6 and an inductor L1 in parallel and a shunt arm consisting of a resistor R7. That shown in Fig. 10 comprises a series arm consisting of an inductor L2 and a shunt arm consisting of an inductor L3 and a resistor R8 in series.

What is claimed is:

1. An integrator comprising a D. C. amplifier having input and output terminals, a resistor serially connected between said amplifier and its input terminal, a first capacitor connecting the output terminal of said amplifier with its input terminal, said capacitor having known absorption decay characteristics, a compensating network connected to the output of said amplifier, said compensating network being comprised of a resistive series arm and a resistive-capacitive shunt arm, and having electrical values which produce a network time-constant characteristic proportional in amplitude and opposite in sense to the absorption decay of electrical charge on said first capacitor.

2. An integrator in accordance with claim 1 in which the compensating portion of the time-constant characteristic of said resistive-capacitive network has a duration substantially that of the elapsed time from the charging and isolation of said first capacitor until the charge of said first capacitor has a substantially steady state of decay.

3. An integrator comprising a D. C. amplifier having input and output terminals, a resistor serially connected between said amplifier and its input terminals, a first capacitor connecting the output of said amplifier with its input, said capacitor having known absorption decay characteristics, a compensating network connected to the output of said amplifier, said compensating network being comprised of a series arm having a resistor and a shunt arm including a resistor and capacitor serially connected, said network elements having electrical values which produce a network time-constant characteristic proportional in amplitude and opposite in sense to the absorption decay of electrical charge on said first capacitor.

4. An integrator in accordance with claim 3 in which the ratio of the resistance in the shunt arm to the resistance in the series arm of said compensating network is substantially equal to the ratio of the initial charge of said first capacitor to the rapid drop in voltage across said first capacitor due to absorption decay.

5. An integrator comprising a D. C. amplifier having input and output terminals, a resistor serially connected between said amplifier and its input terminal, a capacitor connecting the output terminal of said amplifier with its input terminal, said capacitor having actual characteristics which are the equivalent of the calculated characteristics of a theoretical network comprised of ideal capacitors C1, C2 and a resistor R2 connected in shunt and having a resistor R1 serially connected between said ideal capacitors, and a compensating network connected to the output terminals of said amplifier comprising a series arm having a resistor R3 and a shunt arm including a resistor R4 and a capacitor C3 serially connected, said resistors and capacitors being of such electrical values that:

$$R1 \cdot C2 = R4 \cdot C3$$

and $$\frac{R3}{R4} = \frac{C2}{C1}$$

6. The combination with a capacitor to be compensated and having actual characteristics which are the equivalent of the calculated characteristics of a theoretical network comprised of ideal capacitors C1, C2, and a resistor R2 connected in shunt and having a resistor R1 serially connected between said ideal capacitors, a compensating network having input and output terminals and comprising a series arm having a resistor R3 and a shunt arm including a resistor R4 and a capacitor C3 serially connected, said resistors and capacitors being of such electrical values that:

$$R1 \cdot C2 = R4 \cdot C3$$

and $$\frac{R3}{R4} = \frac{C2}{C1}$$

and an isolating buffer unit connected between said capacitor to be compensated and the input terminals of said compensating network.

References Cited in the file of this patent
UNITED STATES PATENTS

| | | |
|---|---|---|
| 2,470,099 | Hall | May 17, 1949 |
| 2,496,337 | De Boisblanc | Feb. 7, 1950 |
| 2,529,547 | Fisher | Nov. 14, 1950 |
| 2,605,451 | Ward et al. | July 29, 1952 |
| 2,637,010 | Charske | Apr. 28, 1953 |